(12) United States Patent
Ozugur et al.

(10) Patent No.: US 8,881,194 B2
(45) Date of Patent: *Nov. 4, 2014

(54) SYSTEM, METHOD, AND COMPUTER-READABLE MEDIUM FOR SYNCHRONIZING MULTICAST CUSTOMIZED CONTENT TO FACILITATE DSLAM COMPLEXITY REDUCTION

(75) Inventors: Timucin Ozugur, Fairview, TX (US); Chao Kan, Frisco, TX (US); Randall B. Sharpe, Chapel Hill, NC (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/086,770

(22) Filed: Apr. 14, 2011

(65) Prior Publication Data
US 2011/0197215 A1    Aug. 11, 2011

Related U.S. Application Data

(63) Continuation of application No. 11/861,709, filed on Sep. 26, 2007, now Pat. No. 7,954,123.

(51) Int. Cl.

| | |
|---|---|
| H04N 7/10 | (2006.01) |
| H04N 7/025 | (2006.01) |
| H04N 21/234 | (2011.01) |
| H04N 21/647 | (2011.01) |
| H04N 21/6405 | (2011.01) |
| H04N 21/44 | (2011.01) |
| H04L 29/06 | (2006.01) |

(52) U.S. Cl.
CPC ...... *H04N 21/44016* (2013.01); *H04L 65/4076* (2013.01); *H04N 21/23424* (2013.01); *H04N 21/64784* (2013.01); *H04N 21/6405* (2013.01); *H04L 65/605* (2013.01)
USPC .......................................................... 725/34

(58) Field of Classification Search
None
See application file for complete search history.

(56) References Cited

U.S. PATENT DOCUMENTS

| | | | |
|---|---|---|---|
| 6,615,039 B1 | 9/2003 | Eldering | |
| 6,831,917 B1 | 12/2004 | Cheriton | |
| 7,376,198 B2 | 5/2008 | Day | |
| 7,500,258 B1 | 3/2009 | Eldering | |
| 2002/0067730 A1 | 6/2002 | Hinderks | |
| 2002/0087976 A1 | 7/2002 | Kaplan et al. | |
| 2002/0184314 A1 | 12/2002 | Riise | |
| 2005/0039205 A1 | 2/2005 | Riedl | |
| 2005/0089035 A1 | 4/2005 | Klemets et al. | |
| 2005/0135365 A1* | 6/2005 | Sung et al. | 370/390 |
| 2005/0193410 A1 | 9/2005 | Eldering | |
| 2006/0107302 A1 | 5/2006 | Zdepski | |
| 2006/0159117 A1 | 7/2006 | Furlong et al. | |

(Continued)

FOREIGN PATENT DOCUMENTS

| | | |
|---|---|---|
| EP | 1220542 A | 7/2002 |
| WO | WO2007102147 A2 | 9/2007 |

*Primary Examiner* — Mark D Featherstone
(74) *Attorney, Agent, or Firm* — RGIP, LLC

(57) ABSTRACT

A method, computer readable medium, and system for advertisement and content distribution are provided. Supplementary content is synchronized with advertisement slots, or commercial intervals, of a program stream and distributed via separate multicast group addresses. The program content is distributed via an alternative multicast group address during commercial intervals. Ports associated with respective users are mapped or otherwise associated with multiple multicast group addresses in a forwarding table thereby allowing distribution of supplementary content, or alternatively the program content, during commercial intervals.

20 Claims, 6 Drawing Sheets

(56) References Cited

U.S. PATENT DOCUMENTS

| | | |
|---|---|---|
| 2006/0253864 A1 | 11/2006 | Easty |
| 2007/0079325 A1 | 4/2007 | de Heer |
| 2007/0174125 A1 | 7/2007 | Poole et al. |
| 2008/0018791 A1* | 1/2008 | Ramaswamy ................ 348/563 |
| 2008/0040742 A1* | 2/2008 | Howcroft et al. ............... 725/34 |
| 2008/0060002 A1 | 3/2008 | Noll et al. |
| 2009/0307732 A1* | 12/2009 | Cohen et al. ................... 725/87 |

* cited by examiner

SYSTEM, METHOD, AND COMPUTER-READABLE MEDIUM FOR SYNCHRONIZING MULTICAST CUSTOMIZED CONTENT TO FACILITATE DSLAM COMPLEXITY REDUCTION

CROSS REFERENCE TO RELATED APPLICATIONS

This application is a continuation application of U.S. application Ser. No. 11/861,709, filed Sep. 26, 2007, entitled "SYSTEM, METHOD, AND COMPUTER-READABLE MEDIUM FOR SYNCHRONIZING MULTICAST CUSTOMIZED CONTENT TO FACILITATE DSLAM COMPLEXITY REDUCTION".

FIELD OF THE INVENTION

The present invention is generally related to content distribution and, more particularly, to customized content distribution in Internet Protocol Television (IPTV) networks.

BACKGROUND OF THE INVENTION

Traditionally, targeted advertisement insertion in networks depends on the advertisement being delivered to a Set Top Box (STB). The STB is a device that connects to a television and an external signal source which converts the signal into content. The content is then displayed on a television screen. In one traditional solution, customized content inserted in the payload on a frame is sent to the STB via unicast. In another approach, multiple content streams are sent concurrently from a source all the way to the STB via different multicast streams. The STB can also tune into a channel, meaning tuning into a different multicast stream, carrying a target advertisement. To this end, the STB needs to precisely determine when to tune into the other multicast stream.

Advertisement insertion in traditional solutions is often based on Society of Cable Telecommunications Engineers (SCTE) 35 and SCTE 30 signaling that was developed for the Cable TV industry. These solutions often provide limited targeting capability, such as to a region, city or serving area constrained by the construction of the distribution network. If addressability is to be achieved for finer granularity, such as to a neighborhood or household, then certain bandwidth is dedicated to the serving household or neighborhood individually. Such a solution does not scale well. These solutions that offer a STB providing advertisement insertion may use a different mechanism than the ones offering traditional network based insertion. Therefore, two different mechanisms are required: live content distribution and STB stored advertisement insertion. Moreover, complex synchronization and insertion functions are required to be located in the STB thus leading to a very complex and expensive STB implementation.

Another mechanism is to merge the ads or other supplementary content at the access node level. The customized ads are delivered to the access node separately via different multicast groups right before the splice time. The access node may keep a table to map multicast groups to outgoing ports. The access node buffers the incoming ads, then evaluates the splice time of the incoming packets in the main program. At the splice time, the access node delivers the buffered ads to respective users instead of the main program. This method requires buffering at the access node and also precise splicing capabilities. Since precise merging capability is an expensive feature, such a system may become prohibitively expensive when every access node employs such capabilities. Another deficiency for this mechanism is the fact that the STBs receive the splice time information. Since splice time information is available, the STBs may be configured to prohibit display of ads.

Therefore, what is needed is a mechanism that overcomes the described problems and limitations.

SUMMARY OF THE INVENTION

The present invention provides a system, method, and computer readable medium that efficiently distributes supplementary content, such as customized advertisement content, in a network system.

In accordance with an embodiment, mechanisms for distribution of supplementary content are provided. Supplementary content is synchronized with commercial intervals, or advertisement slots, of a program stream and distributed via separate multicast group addresses. The program content may be distributed via an alternative multicast group address during commercial intervals. STBs or other end user devices may be mapped or otherwise associated with multiple multicast group addresses in a forwarding table thereby allowing distribution of supplementary content, or alternatively the program content, during commercial intervals.

In one embodiment of the disclosure, a method for advertisement and content distribution in a hierarchical network system is provided. The distribution method includes receiving program content via a primary multicast group address, receiving supplementary content associated with a different multicast group address (different than primary and alternative multicast group addresses), transmitting the program content downstream via the primary multicast group address during a non-commercial interval, prohibiting transmission of the program content downstream during a commercial interval, transmitting the supplementary content downstream via the another multicast group address different than primary and alternative multicast group addresses during the commercial interval, and transmitting the program content downstream via an alternative multicast group address during the commercial interval.

In another embodiment of the disclosure, a method for advertisement and content distribution to end user devices in a network system is provided. The distribution method includes receiving program content via a primary multicast group address, transmitting the program content to a plurality of end user devices mapped to the primary multicast group address in a forwarding table, wherein the plurality of end user devices includes a first end user device and a second end user device, receiving supplementary content via another multicast group address different than primary and alternative multicast group addresses substantially synchronized with a commercial interval of the program content, transmitting the supplementary content to the first end user device, wherein the first end user device is mapped to another multicast group address different than primary and alternative multicast group addresses in the forwarding table, receiving the program content via an alternative multicast group address in substantial synchronization with the commercial interval, and transmitting the program content to the second end user device in association with the alternative multicast group address, wherein the second end user device is mapped to the alternative multicast group address in the forwarding table.

In another embodiment of the disclosure, a computer-readable medium having computer-executable instructions for execution by a processing system, the computer-executable instructions for advertisement and content distribution in a network system is provided. The computer-readable medium comprises instructions for receiving program content via a primary multicast group address, receiving supplementary content associated with another multicast group address different than primary and alternative multicast group addresses, transmitting the program content downstream via the primary multicast group address during a non-commercial interval, prohibiting transmission of the program content downstream during a commercial interval, transmitting the supplementary content downstream via another multicast group address different than primary and alternative multicast group addresses during the commercial interval, and transmitting the program content downstream via an alternative multicast group address during the commercial interval.

In another embodiment of the disclosure, a computer-readable medium having computer-executable instructions for execution by a processing system, the computer-readable medium comprising instructions for advertisement and content distribution to end user devices in a network system is provided. The computer-readable medium comprises instructions for receiving program content via a primary multicast group address, transmitting the program content to a plurality of end user devices mapped to the primary multicast group address in a forwarding table, wherein the plurality of end user devices includes a first end user device and a second end user device, receiving supplementary content via another multicast group address different than primary and alternative multicast group addresses substantially synchronized with a commercial interval of the program content, transmitting the supplementary content to the first end user device, wherein the first end user device is mapped to the multicast group address different than primary and alternative multicast group addresses in the forwarding table, receiving the program content via an alternative multicast group address in substantial synchronization with the commercial interval, and transmitting the program content to the second end user device in association with the alternative multicast group address, wherein the second end user device is mapped to the alternative multicast group address in the forwarding table.

In a further embodiment of the disclosure, a system for content distribution is provided. The system comprises a video hub office adapted to receive program content via a primary multicast group address or via unicast and supplementary content via a multicast group address different than primary and alternative multicast group addresses or via unicast, an access module communicatively coupled with the video hub office, and a plurality of set top boxes including a first set top box and a second set top box each communicatively coupled with the access module, wherein the video hub office transmits the program content to the access module via the primary multicast group address during a non-commercial interval, wherein the video hub office is adapted to identify a commercial interval in the program content, terminate transmission of the program content via the primary multicast group address, transmit the supplementary content via a multicast group address different than primary and alternative multicast group addresses and transmit the program content via an alternative multicast group address responsive to identifying the commercial interval.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
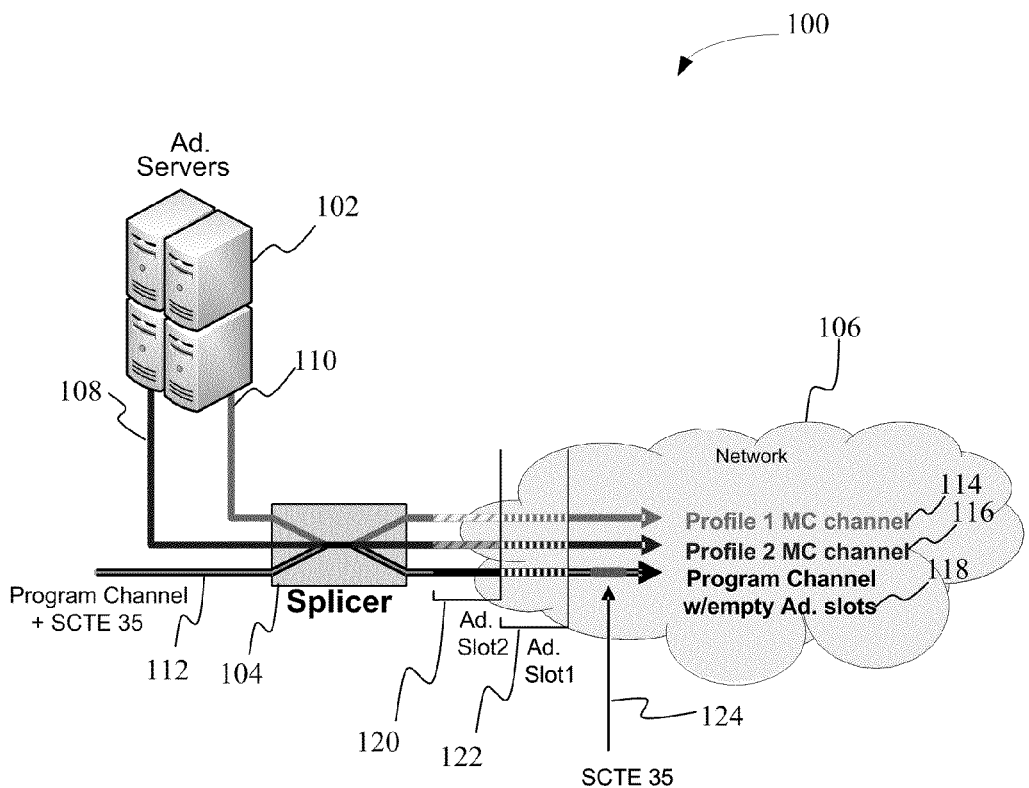
FIG. 1 is a diagrammatic representation of a system comprising an advertisement server and an advertisement splicer coupled to a network and configured for content distribution in accordance with a conventional implementation.

Now referring to FIG. 1, a system 100 comprises advertisement servers 102 and an advertisement splicer 104 coupled to a network 106 for distribution of advertisement content in accordance with a conventional implementation. The advertisement servers 102 may inject several advertisements 108 and 110 relevant to a set of user profiles into multiple multicast channels 114 and 116 synchronized to a first and a second single advertisement slot 120 and 122 as indicated by SCTE 35 signaling 124 accompanying the program stream 112. More than one advertisement is able to be inserted into an ad slot 120 and 122. The program stream 112 will be empty during the duration of the advertisement. By configuration, profile, or other criteria, the SCTE 35 triggers the end device to join a particular multicast advertisement stream of interest.

Advertisement splicer 104 may also remove any content or the default advertisement from the program stream if bandwidth, processing, or other similar constraints exist in the network. The removed advertisement could be placed in yet another multicast stream. The program stream will be empty during the duration of the ad which will enable mixing at an access node or STB after short buffering and with special timing mechanism to merge the streams. The SCTE 35 signaling may be forwarded in the Moving Picture Experts Group 2 (MPEG2) timeslot to a Set Top Box (STB) to inform the STB of an imminent ad slot.

In accordance with an embodiment, mechanisms for distribution of advertisement content or other supplementary content (collectively referred to herein as supplementary content) are provided. Supplementary content may be synchronized with advertisement slots of a program stream and distributed via separate multicast group addresses. The program content may be distributed via an alternative multicast group address during advertisement slots. As referred to herein, a primary multicast group address is a multicast group address via which a program stream, or program content, is originally distributed in a network system. As referred to herein, an alternative multicast group address is a multicast group address used to distribute program content during a commercial interval. The alternative multicast group address is different than the primary multicast group address, and additionally is different that any multicast group addresses by which advertisement or supplementary content is distributed. STBs or other end user devices may be mapped or otherwise associated with multiple multicast group addresses in a multicast forwarding table thereby allowing distribution of supplementary content, or alternatively the program content, during advertisement slots as described more fully hereinbelow. In another implementation, before exiting the access node, the multicast group address is changed to the primary multicast group address regardless of whether the frame belongs to supplementary content with a multicast group address different than primary and alternative multicast group addresses or program content with the alternative multicast group address. In this case, the STB or end user device doesn't need to tune in from one multicast group address to another.

Figure 2:
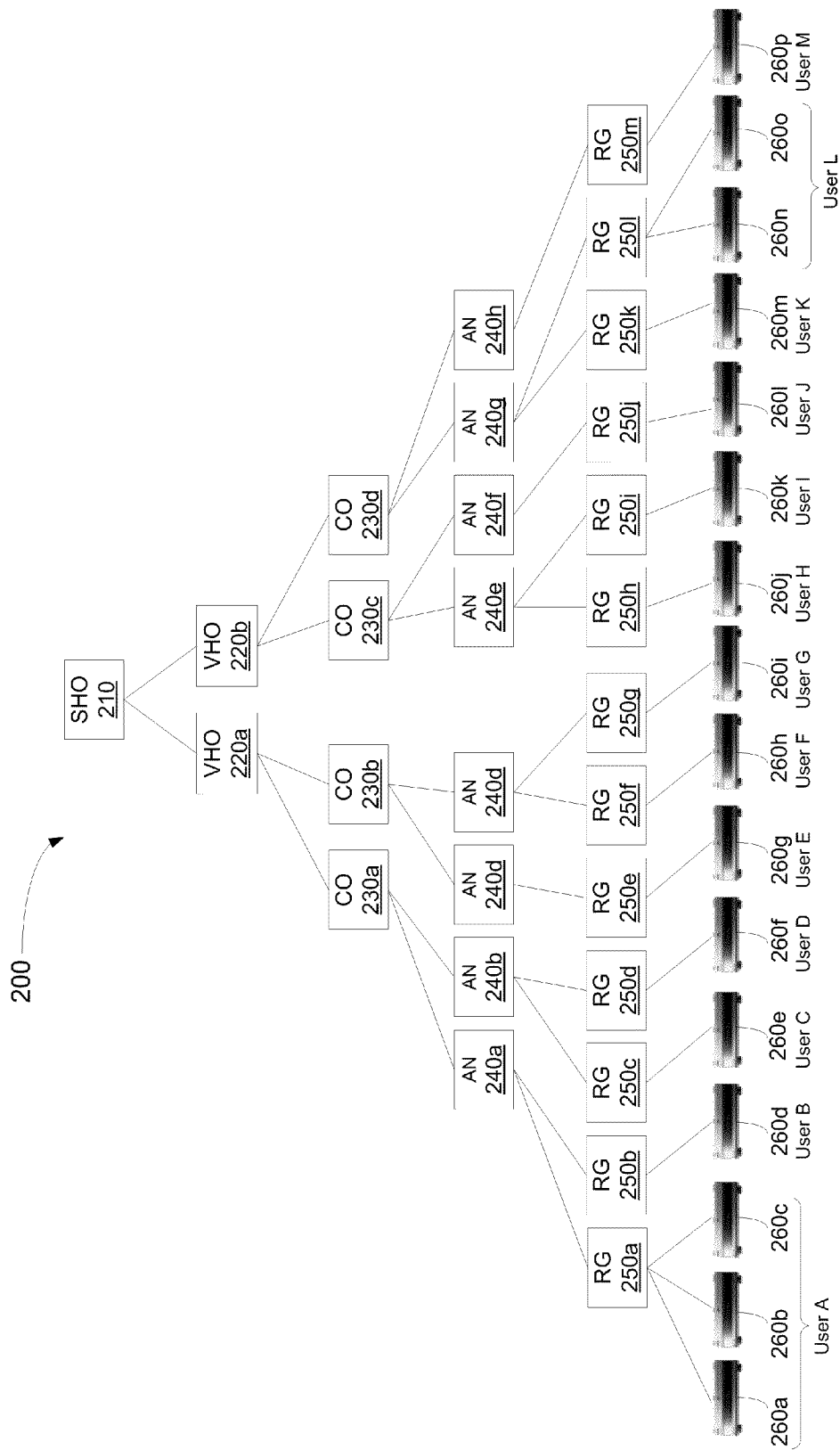
FIG. 2 is a diagrammatic representation of a hierarchical network system configuration in which content distribution mechanisms may be deployed in accordance with an embodiment.

FIG. 2 is a diagrammatic representation of a hierarchical network system 200 configuration in which supplementary content may be distributed in accordance with an embodiment. Network system 200 may include a super hub office (SHO) 210 deployed at the top of the network hierarchical configuration. SHO 210 may generally comprise one or more content acquisition systems that aggregate content for a large area, e.g., on a national region, and encode the content for distribution in network system 200. Demographic market areas may then be serviced by video hub offices (VHOs) 220a-220b that provide for regional content aggregation. Various intermediate offices or central office (COs) 230a-230d may be disposed further downstream in network system 200. SHO 210, VHOs 220a-220b, and COs 230a-230d may be deployed in separate geographic regions to distribute content to subscribers over high speed digital communication lines. Access nodes (ANs) 240a-240h may be included with a CO 230a-230d. Alternatively, ANs 240a-240h may be deployed in a carrier serving area that is interfaced with a CO. The ANs may be implemented as, for example, Digital Subscriber Line Access Multiplexers (DSLAMs). ANs 240a-240h aggregate multiple subscriber digital subscriber lines (DSL) to a high-speed Internet backbone using multiplexing, switching, or routing mechanisms. ANs 240a-240h may each interface with a residential gateway (RG) 250a-250m that, in turn, may each service one or more STBs 260a-260p deployed on a subscriber premise.

Customized content, such as customized ad content, is conventionally introduced at the VHO level. That is, a respective splicer, such as splicer 104, may be interfaced with VHOs 220a and 220b. Splicer 104 splices the incoming multicasting streams to a limited number of streams, e.g., 50 streams. However, such an implementation has numerous deficiencies. Most notably, implementation of a splicer at the VHO level may result in a limited number of customizations. Current implementations only allow one customization per VHO area.

Figure 3:
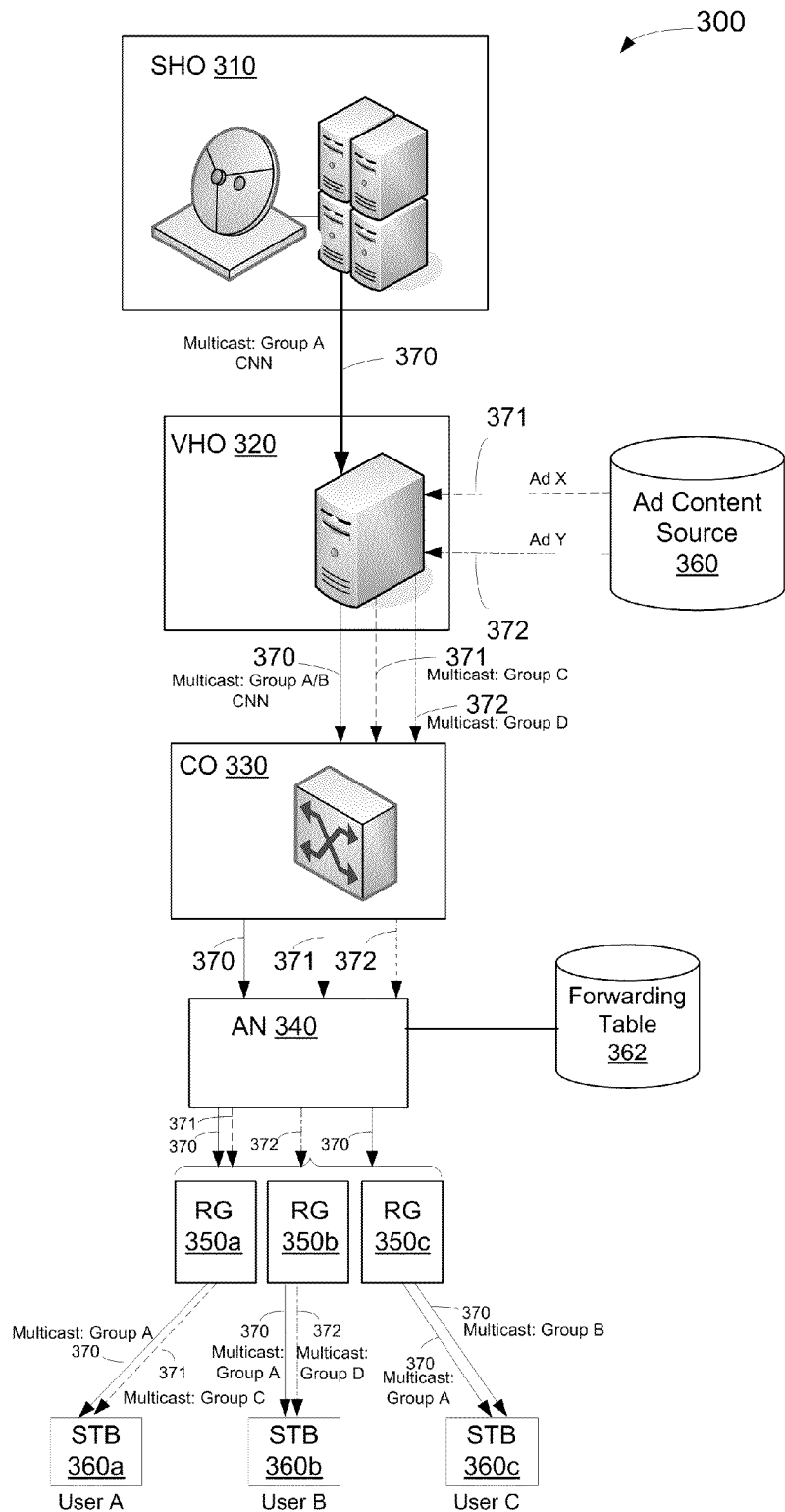
FIG. 3 is a diagrammatic representation of a network system that facilitates distribution of customized content in accordance with an embodiment of the invention.

FIG. 3 is a diagrammatic representation of a network system 300 that facilitates distribution of supplementary content in accordance with an embodiment of the invention. The supplementary content may comprise, for example, customized advertisement content. A supplementary content distribution mechanism may be implemented in system 300 such that ads or other customized content are distributed downstream via respective multicast groups at the VHO level at the splicing time. In the depicted example and description, it is assumed that the VHO includes splicer functionality. A main program 370, e.g., the channel content, is distributed from a SHO 310 to a downstream VHO 320 via a multicast group (illustratively designated Multicast Group A). In the present example, the main program comprises a CNN program stream. As referred to herein, a primary multicast group comprises a multicast group address via which a program stream is originally distributed in system 300. Thus, in the present example, Multicast Group A comprises a primary multicast group. VHO 320 may receive supplementary content 371 and 372 via one or more sources 360, such as advertisement servers. In the present example, the supplementary content is illustratively designated "Ad X" and "Ad Y". On receipt of program 370, VHO 320 may copy program 370 into a new, alternative multicast group (illustratively designated Multicast Group B) different than the primary multicast group. In accordance with an embodiment, VHO 320 is configured to prohibit transmission of program 370 via the primary multicast group during a detected commercial interval of program 370, e.g., during an advertisement slot of program 370. Instead, VHO 320 transmits program 370 downstream to AN 340, for example by way of CO 330, via the newly assigned, or alternative, multicast group (Multicast Group B in the illustrative example). During non-commercial intervals, VHO 320 may transmit the program content via the primary multicast group. Supplementary content 371 and 372 may be transmitted downstream to AN 340 via respective multicast groups (illustratively designated Multicast Group C and Multicast Group D, respectively) during the commercial interval. Transmission of supplementary content 371 and 372 is synchronized with the commercial interval in accordance with an embodiment.

At AN 340, a multicast forwarding table 362 may map each outgoing port of AN 340 associated with a respective user to more than one multicast group address. Outgoing ports associated with users configured to receive customized ads or other supplementary content are mapped to the original multicast group address of the main program and the multicast group address assigned for the respective customized ad. Outgoing ports for users configured to receive the ads in the main program, but not customized ads, are mapped to the primary multicast group address of the program and the alternative multicast group address assigned to the main program by VHO 320. Advantageously, since there is no transmission of the main program via the primary multicast group address during commercial intervals, no content collision will occur at the outgoing ports. AN 340 forwards the main program and customized ads to respective ports without buffering for transmission to STBs 360a-360c via RGs 350a-350c. Moreover, video packets carrying the main program do not carry any splicing information, and thus STBs 360a-360c receiving the program will not receive splicing information which can be used to extract the ads and discard them.

Figure 4:
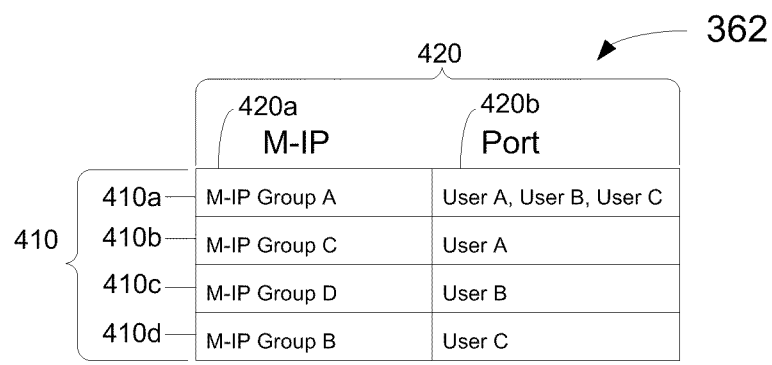
FIG. 4 is a diagrammatic representation of a multicast forwarding table that facilitates customized content distribution in accordance with an embodiment of the invention.

FIG. 4 is a diagrammatic representation of a multicast forwarding table 362 that facilitates supplementary content distribution in accordance with an embodiment of the invention. Table 362 comprises a plurality of records 410a-410d (collectively referred to as records 410) and fields 420a-420b (collectively referred to as fields 420) in which an embodiment of the present invention may be implemented to advantage. Table 362 may be stored on a memory of AN 340 and processed thereby. Each record 410a-410d, or row, comprises data elements in respective fields 420a-420b.

Fields 420a-420b have a respective label, or identifier, that facilitates insertion, deletion, querying, or other data operations or manipulations of table 362. In the illustrative example, fields 420a-420b have respective labels of "M-IP" and "Port."

In the present example, M-IP field 420a stores data elements that comprise multicast-IP group addresses. Particularly, multicast-IP group addresses of records 410a-410d are illustratively designated "M-IP Group A", "M-IP Group C", "M-IP Group D", and M-IP Group "B" and are each representative of a multicast-IP Group Address, e.g., an IPv4, an IPv6, or other suitable IP address. Referring again to FIG. 3 in conjunction with FIG. 4, the M-IP group address of record 410a is the multicast group address on which program 370 is multicast from SHO 310. The M-IP address of record 410b is the multicast group address via which Ad X content is distributed from VHO 320, and the M-IP group address of record 410c is the multicast group address via which Ad Y content is distributed from VHO 320. The M-IP group address of record 410d is the multicast group address which VHO 320 has copied content of program 370 and multicast the copied content therefrom. That is, the M-IP group address of record 410d is the alternative multicast group address assigned to program 370 by VHO 320.

Field 420b stores data elements that specify an output port of AN 340 associated with a particular user. In the present example, field 420b of record 410a specifies ports of "User A", "User B", and "User C" thereby indicating that STBs 360a-360c are configured to receive program 370 (CNN in the present example). It is understood that the actual data elements of field 420b may comprise port IDs, and designation of the ports as User A-User C is made to facilitate an understanding of the disclosed embodiments. Field 420b of record 410b stores a data element that specifies an output port of AN 340 associated with user(s) configured to receive supplementary content specified in corresponding field 420a of record 410b. Thus, in the present example, User A is configured to receive content of Ad X via multicast Group C. In a similar manner, field 420b of record 410c specifies that User B is configured to receive content of Ad Y via multicast Group D. Field 420b of record 410d specifies that User C is to receive program content via multicast group B. That is, User C is not configured to receive any customized content, but rather is configured to receive any ad content transmitted in program 370.

To better understand the described embodiments, consider the following scenario. Assume Users A, B, and C are all watching CNN at respective STBs 360a-360c. Accordingly, in the multicast forwarding table 362, the multicast group address (Multicast Group A) is mapped to outgoing ports for Users A, B and C as depicted by record 410a in FIG. 4.

According to the profiles, User A is selected to watch ad X as indicated by record 410b, User B is selected to watch ad Y as indicated by record 410c, and user C is selected to watch the ad in the main program during the commercial interval, that is User C is not configured to receive customized content, as indicated by record 410d. Particularly, the alternative multicast group address (illustratively designated multicast group B) set by VHO 320 for program 370 is mapped to the outgoing port for User C. The content for multicast groups "A" and "B" are the same.

During non-commercial intervals, program 370 is transmitted to STBs 360a-360c via the original multicast group A associated with program 370 according to record 410a of multicast forwarding table 362. During commercial intervals, VHO 320 stops sending program 370 via multicast group address "A" and, instead, sends the main program via the alternative multicast group "B".

At the commercial interval, ad source 360 sends ads 371 (Ad X) and 372 (Ad Y) to VHO 320. VHO 320 transmits ad 371 using multicast group address "C" and ad 372 using multicast group address "D." Additionally, VHO 320 begins sending program 370 using multicast group address "B" at the commercial interval. VHO 320 does not send anything using multicast group address "A" during the commercial interval.

When AN 340 receives the packets with respective multicast group addresses, the packets are forwarded to the respective outgoing ports according to multicast forwarding table 362. In the present example, AN 340 will send ad 371 to STB 350a associated with User A and will send ad 372 to STB 350b associated with User B at the commercial interval of program 370. User C will continue to receive program 370 because User C is mapped to the multicast group "B" which corresponds to program 370 transmission during commercial intervals. At the end of the commercial interval, VHO 320 returns to sending program 370 to AN 340 via multicast group "A", and program 370 will then be transmitted to each of users A, B, and C according to record 410a of multicast forwarding table 362. In this case, STBs need to tune into new multicast group addresses at the exact time of the commercial interval. The AN may change the multicast group addresses of frames of ad 371, ad 372 and the main program content during the commercial interval from multicast group address "C", multicast group address "D" and multicast group address "B", respectively, to multicast group address "A" before transmitting the frames to the respective users. Advantageously, STBs of respective users do not need to tune into any other multicast group address, but instead keep tuned into multicast group address "A" only.

Advantageously, the described method provides for better customization and scalability than conventional content distribution mechanisms. Moreover, the distribution system may be implemented with less expensive and less complex AN architectures to support the customized ad insertion. Buffer and splicing functionality may be excluded at the AN which makes the AN less expensive. Thus, deployment of the described implementation is less expensive than conventional mechanisms. The multicast forwarding table 362 operation advantageously does not require table swapping. Moreover, STBs do not receive any indication regarding the starting time, i.e., commercial interval information, and therefore cannot alter the video streams to eliminate commercials.

Figure 5:
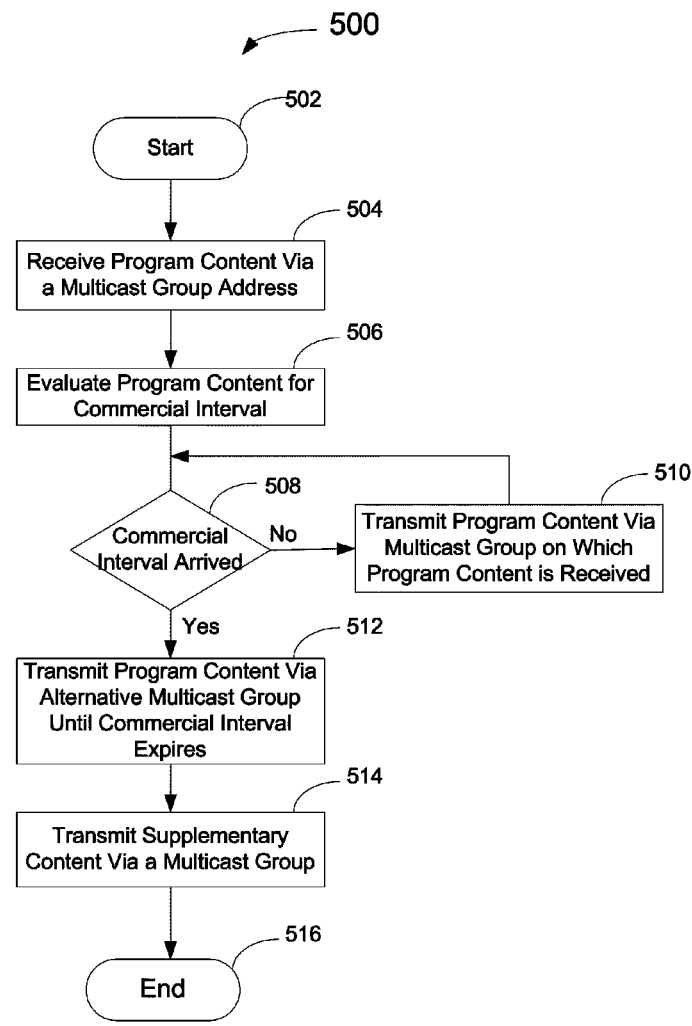
FIG. 5 is a flowchart depicting processing of a customized content distribution routine implemented in accordance with an embodiment of the invention.

FIG. 5 is a flowchart depicting processing of a supplementary content distribution routine implemented in accordance with an embodiment of the invention. The processing steps of FIG. 5 may be implemented as computer-executable instructions executable by a processing system, such as a video hub office.

The content distribution routine is invoked (step 502), and program content is received via a multicast group (step 504). The program stream may then be evaluated for a commercial interval (step 506). An evaluation may be made to determine if the commercial interval has arrived (step 508). In the event that the commercial interval has not arrived, the program content may be transmitted downstream, e.g., to a CO, via the multicast group via which the program content was received (step 510), and the content distribution routine may continue to monitor the program for a commercial interval.

On identification of a commercial interval, the program content may be transmitted downstream via an alternative multicast group (step 512). At this time, the content distribution routine may transmit one or more customized or supplementary content streams, e.g., ad content, via respective multicast groups different than primary and alternative multicast group addresses (step 514). Transmission of the program content via the alternative multicast group and transmission of the supplementary content via the multicast group different than primary and alternative multicast group addresses may continue until expiration of the commercial interval, and the distribution routine may then return to transmission of the program content via the primary multicast group. The distribution routine cycle may then end (step 516).

Figure 6:
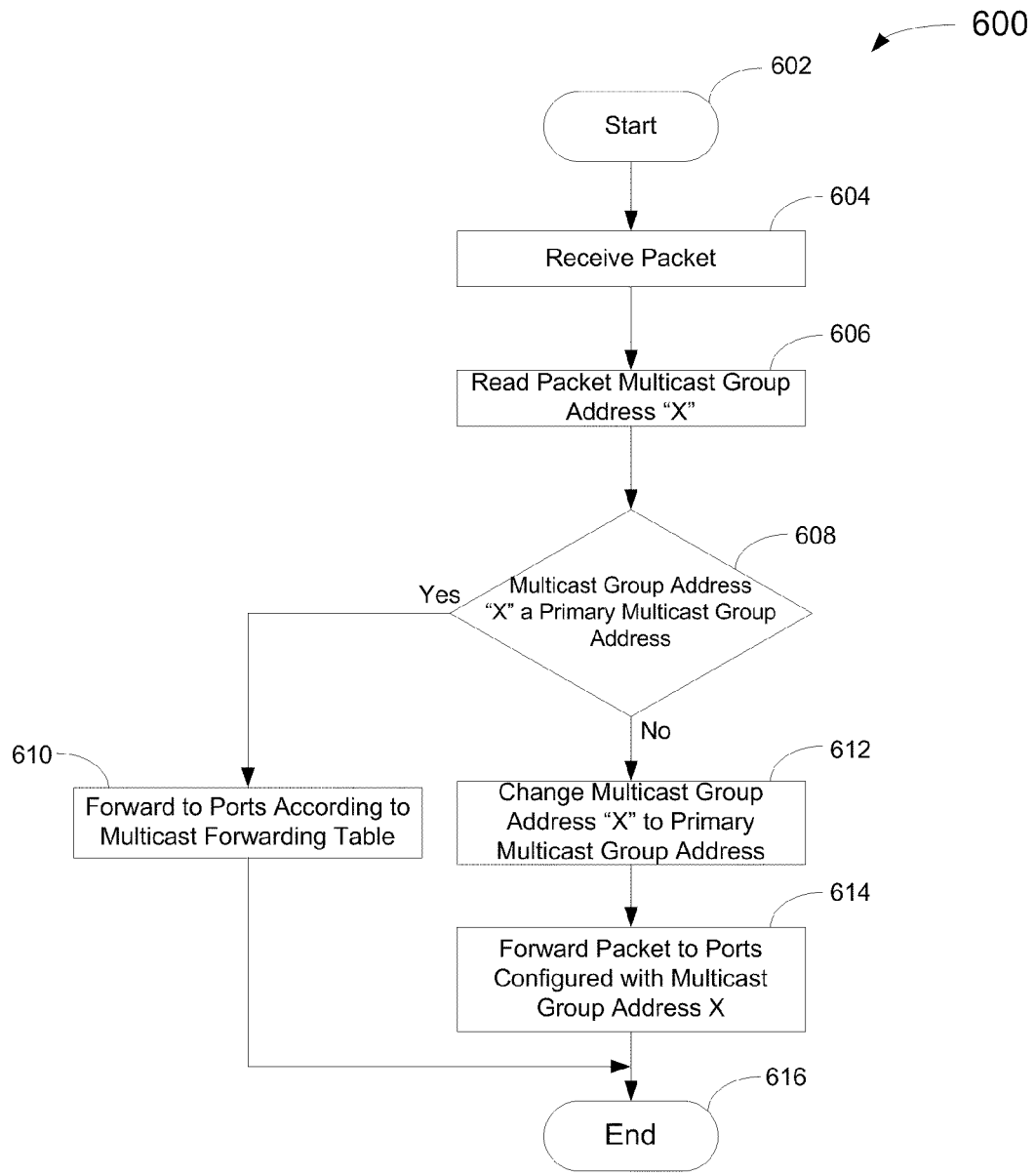
FIG. 6 is a flowchart depicting processing of a customized content distribution routine for distributing content to end user devices in accordance with an embodiment of the invention.

FIG. 6 is a flowchart depicting processing of a supplementary content distribution routine for distributing content to end user devices, such as STBs, in accordance with an embodiment of the invention. The processing steps of FIG. 6 may be implemented as computer-executable instructions executable by a processing system, such as an AN.

The content distribution routine is invoked (step 602), and a packet is received by an AN (step 604). The packet multicast group address (Multicast group address "X") is read from the packet (step 606), and the AN evaluates whether the multicast group address of the received packet is a primary multicast group address (step 608). If the multicast group address is a primary multicast group address, the AN forwards the packet to any port configured in the multicast forwarding table to receive content of the primary multicast group address (step 610). In the example multicast forwarding table of FIG. 3, a packet received having a primary multicast group address would be forwarded to the ports associated with User A, User B, and User C as indicated by record 410a. The processing routine cycle may then end (step 616).

Returning again to step 608, in the event that the multicast group address "X" read from the received packet is not a primary multicast group address, the AN may change the multicast group address read from the packet to the primary multicast group address (step 612). The packet may then be forwarded to any port configured in the multicast forwarding table to receive content of the multicast group address "X" originally read from the packet (step 614). The processing routine cycle may end according to step 616.

As an example, assume the multicast group address read from the received packet at step 606 is multicast group address "C". At step 608, the AN determines the multicast group address read from the packet is not a primary multicast group address. At step 612, the AN changes the multicast group address of the packet from multicast group address "C" to multicast group address "A" (the primary multicast group address in the illustrative examples). The packet now bearing the multicast group address "A" is then forwarded to the port associated with user A, that is to any user configured to receive content of multicast group address "C". Accordingly, User A's STB or other device receives the content via the primary multicast group address, and thus is not required to tune to a different channel at the commercial interval.

Current STBs may have limitations, such that switching from receiving one multicast group to another multicast group at a precise moment is difficult or prohibitively expensive. In order to eliminate this complexity at STBs, when an AN receives streams with different multicast group addresses, the AN may change this address to the multicast group address of the main program before forwarding it downstream in accordance with another embodiment. In this implementation, STBs will only receive one multicast group address, and thus are not required to switch sockets to receive the main program or supplementary content.

In still other embodiments, mechanisms implemented in accordance with disclosed embodiments may be deployed to accommodate other network entities. For example, an embodiment employing source specific multicast (SSM) may be deployed such that content having a source address corresponding to an SHO is modified to specify the VHO.

As described, mechanisms for distribution of supplementary content in a network system are provided. Supplementary content is synchronized with advertisement slots, or commercial intervals, of a program stream and distributed via separate multicast group addresses different than primary and alternative multicast group addresses. The program content may be distributed via an alternative multicast group address during commercial intervals. STBs or other end user devices may be mapped or otherwise associated with multiple multicast group addresses thereby allowing distribution of supplementary content, or alternatively the program content, during commercial intervals.

The flowcharts of FIGS. 5-6 depict process serialization to facilitate an understanding of disclosed embodiments and are not necessarily indicative of the serialization of the operations being performed. In various embodiments, the processing steps described in FIGS. 5-6 may be performed in varying order, and one or more depicted steps may be performed in parallel with other steps. Additionally, execution of some processing steps of FIGS. 5-6 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   receiving program content via a primary multicast group address;
   transmitting the program content to a plurality of ports mapped to the primary multicast group address in a table, wherein the plurality of ports includes a first port and a second port;
   receiving supplementary content via a second multicast group address, different than the primary multicast group address;
   transmitting the supplementary content to the first port, wherein the first port is mapped to the second multicast group address in the table;
   receiving the program content via an alternative multicast group address;
   identifying an end of a commercial interval of the program content;
   terminating transmission of the program content via the alternative multicast group address; and
   transmitting the program content via the primary multicast group address responsive to identifying the end of the commercial interval.

2. The method of claim 1 comprising transmitting the program content to the second port in association with the alternative multicast group address, wherein the second port is mapped to the alternative multicast group address in the table, and wherein the alternative multicast group address is different than the primary multicast group address and the second multicast group address.

3. The method of claim 1, wherein transmitting the program content mapped to the primary multicast group address comprises transmitting the program content to a respective digital subscriber line access module output port.

4. The method of claim 1, wherein transmitting the supplementary content to the first port comprises changing the second multicast group address of packets containing the supplementary content to the primary multicast group address.

5. The method of claim 1, wherein receiving supplementary content via the second multicast group address is substantially synchronized with a commercial interval of the program content.

6. The method of claim 1, wherein receiving the program content via the alternative multicast group address is substantially synchronized with the commercial interval.

7. The method of claim 1, wherein the program content does not include splicing information.

8. The method of claim 3, wherein transmitting the program content mapped to a respective digital subscriber line access module output port includes transmitting the program content to a first output port, wherein transmitting the supplementary content comprises transmitting the supplementary content to the first output port, and wherein transmitting the program content to the first output port is terminated substantially in synchronization with transmission of the supplementary content to the first output port.

9. The method of claim 4, comprising transmitting the packets to any ports mapped to the second multicast group address.

10. The method of claim 9, wherein transmitting the program content via the primary multicast group address is terminated substantially in synchronization with transmitting the program content via the alternative multicast group address.

11. An apparatus, comprising:
    a memory configured to receive and store program content via a primary multicast group address, and supplementary content via a second multicast group address, different than the primary multicast group address, and also receive the program content via an alternative multicast group address;
    a transmitter configured to transmit the program content to a plurality of ports mapped to the primary multicast group address in a table stored in the memory, wherein the plurality of ports includes a first port and a second port, and wherein the transmitter is further configured to transmit the supplementary content to the first port mapped to the second multicast group address in the table; and
    a processor communicably coupled to the memory, the processor being configured to:
      identify an end of a commercial interval of the program content;
      terminate transmission of the program content via the alternative multicast group address, and
    wherein the transmitter is also configured to transmit the program content via the primary multicast group address responsive to identifying the end of the commercial interval.

12. The apparatus of claim 11, wherein the program content is terminated via the primary multicast group address.

13. The apparatus of claim 11, wherein the access module comprises a digital subscriber line access module.

14. The apparatus of claim 11, wherein the table is an internet group management protocol forwarding table comprising a mapping of a first group of the plurality of ports including a first port and a second port to the primary multicast group address and a mapping of the first port to the alternative multicast group address.

15. The apparatus of claim 12, wherein the program content is received via the alternative multicast group address responsive to the commercial interval being identified.

16. The apparatus of claim 12, wherein the alternative multicast group address is different than the primary multicast group address and the second multicast group address, and wherein the program content does not include splicing information.

17. The apparatus of claim 14, wherein the program content is received by the first group of the plurality of ports during a non-commercial interval of the program content, and the program content is received by the first port via the alternative multicast group address during the commercial interval.

18. The apparatus of claim 14, wherein the supplementary content is received via the second multicast group address responsive to the commercial interval being identified.

19. The apparatus of claim 18, wherein the internet group management protocol forwarding table comprises a mapping of the second port to the second multicast group address, and wherein the supplementary content is transmitted to the second port responsive to the commercial interval being identified.

20. A method, comprising:
    transmitting program content to a plurality of ports mapped to a primary multicast group address, wherein the plurality of ports includes a first port and a second port;

receiving supplementary content via a second multicast group address;

transmitting the supplementary content to the first port by changing the second multicast group address of packets containing the supplementary content to the primary multicast group address, wherein the first port is mapped to the second multicast group address;

receiving the program content via an alternative multicast group address;

identifying an end of a commercial interval of the program content;

terminating transmission of the program content via the alternative multicast group address; and transmitting the program content via the primary multicast group address.

* * * * *